United States Patent [19]

Delsanne et al.

[11] Patent Number: 5,263,279
[45] Date of Patent: Nov. 23, 1993

[54] PROP-SUPPORTING DEVICE

[76] Inventors: Léopold Delsanne, 4300 Fabre, Montreal, Quebec, Canada, H2J 3T6; Daniel McLaughlin, 3950 Sir Wilfrid Laurier, apt. 606, St. Hubert, Quebec, Canada, J3Y 5Y9; Jean-Marie Allard, 449 Duvernay, Longueuil, Quebec, Canada, J4K 4K6

[21] Appl. No.: 837,879

[22] Filed: Feb. 20, 1992

[30] Foreign Application Priority Data

Feb. 26, 1991 [CH] Switzerland ............... 2037110

[51] Int. Cl.⁵ ................................. A01G 9/12
[52] U.S. Cl. ................................. 47/70; 248/530
[58] Field of Search ............... 47/70, 42; 248/523, 248/530, 156, 545, 214, 231.8, 298, 414

[56] References Cited

U.S. PATENT DOCUMENTS

| 500,140 | 6/1893 | Kruger | 47/70 |
|---|---|---|---|
| 548,508 | 10/1895 | Bjelland | 47/70 |
| 687,283 | 11/1901 | Springer | 47/70 |
| 1,766,094 | 6/1930 | Bauer . | |
| 2,134,242 | 10/1938 | Wade . | |
| 3,010,256 | 11/1961 | Ise . | |
| 3,241,798 | 3/1966 | Nestor | 248/156 X |
| 4,307,540 | 12/1981 | Reisner . | |
| 4,480,403 | 11/1984 | Williams . | |

Primary Examiner—David M. Purol
Attorney, Agent, or Firm—ROBIC

[57] ABSTRACT

A support device for rigidly holding an upright prop driven into a ground mixture in a container having an upper rim. The device comprises an elongated member provided at one end with a ring in which the prop may be slid and held substantially vertically when it is set in ground mixture. The device also comprises a sleeve that can be clipped onto the rim of the container, the sleeve slideably receiving the elongated member and holding it in a direction perpendicular to the rim. The elongated member is detachably locked within the sleeve by a pawl which projects from the sleeve in such a manner as to engage a notch being part of a series of spaced apart notches made in the elongated member. Clipping of the sleeve onto the rim can be achieved with a pair of flexible ears downwardly projecting from under the sleeve and laterally projecting toward a rigid spike also downwardly projecting from under the sleeve in such a manner as to be driveable into the ground mixture, the rim being squeezed between this spike and the ears.

7 Claims, 3 Drawing Sheets

PROP-SUPPORTING DEVICE

BACKGROUND OF THE INVENTION

The present invention relates to a support device for rigidly holding an upright prop driven into a ground mixture in a container.

Known in the art is U.S. Pat. No. 4,480,403 to Wilburn R. WILLIAMS, granted on Nov. 6, 1984. This patent describes an apparatus for supporting a cantilevered beam from a T-shaped post. This apparatus comprises a bracket beam, including a pair of spaced horizontal plates in which one end of the cantilevered beam is welded, the plates having a cross-shaped aperture therein for vertically sliding registry with the T-shaped post. Fastening means are operatively associated with the bracket for bearing against the post to rigidly locate the bracket in a variable position thereon. This invention is intended to be used to provide a support for a plant. To do so, the plant to be supported is attached with a collar to the free end of the cantilevered beam. The goal of this invention is essentially to eliminate the necessity of guide lines running from the ground to a plant support collar.

Even if the problem of eliminating plant support guide lines is solved by this patent, another problem persists when the post cannot be rigidly driven into the ground. Furthermore, this invention may be not adequate to hold a small plant, especially when it is potted, since it is designed to be used in other applications such as a mailbox support and a sign support.

Also known in the art are U.S. Pat. No. 1,766,094 to J. W. BAUER, U.S. Pat. No. 2,134,242 to N. C. WADE, U.S. Pat. No. 3,010,256 to Robert E. ISE, U.S. Pat. No. 4,307,540 to Clarence H. REISNER and U.S. Pat. No. 4,480,403 to Wilburn R. WILLIAMS that disclose different support devices for holding a plant. One of the drawbacks of the support devices disclosed in the abovementioned patents is that they all use a prop which may become loose after a while, because it was not rigidly driven in the ground, or because the plant becomes too heavy for it, or during watering.

OBJECT OF THE INVENTION

It is an object of the present invention to provide a prop-support device, i.e. a device that can be easily and firmly fixed to the rim of a container in which a plant is empotted, in order to rigidly hold a prop set into this container.

SUMMARY OF THE INVENTION

According to the present invention, there is provided a support device for rigidly holding an upright prop driven into a ground mixture, the ground mixture being in a container having an upper rim, the device comprising:
(a) an elongated member;
(b) prop-fastening means attached to an extremity of the member, for holding substantially vertically the prop when this prop is set in the ground mixture; and
(c) attaching means for detachably mounting the elongated member onto the upper rim, the attaching means comprising:
　(i) a sleeve for slideably receiving the elongated member in a direction substantially perpendicular to the rim;
　(ii) means for detachably locking the member within the sleeve; and
　(iii) clipping means for detachably fixing the sleeve to the rim.

There is also provided a support device for rigidly holding an upright prop driven into a ground mixture, the ground mixture being in a container having an upper rim, the device comprising:
(a) an elongated member;
(b) a ring attached to an extremity of the member, in which the prop may be slid and held substantially vertically when the prop is set in the ground mixture, the ring and elongated member being made of a single plastic piece; and
(c) attaching means for detachably mounting the elongated member onto the upper rim, the attaching means being made of a single plastic piece and comprising:
　(i) a sleeve for slideably receiving the elongated member in a direction substantially perpendicular to the rim;
　(ii) means for detachably locking the member with the sleeve, these means comprising a pawl operatively connected to the sleeve, and positioned to fit into a notch being part of a series of spaced apart notches made in the elongated member; and
　(iii) clipping means for detachably fixing the sleeve to the rim, the clipping means comprising a pair of flexible ears downwardly projecting under the sleeve and laterally projecting toward a rigid spike so that a section of each ear is always pushing against the rim in order to squeeze the rim against the spike, this spike downwardly projecting from under the sleeve and being driveable into the ground mixture.

BRIEF DESCRIPTION OF THE DRAWINGS

In order to impart full understanding of the manner in which these and other objectives are attained in accordance with the invention, a preferred embodiment thereof will now be described with reference to the accompanying drawings, which form a part of this specification, and wherein.

DESCRIPTION OF A PREFERRED EMBODIMENT OF THE INVENTION

Figure 1:
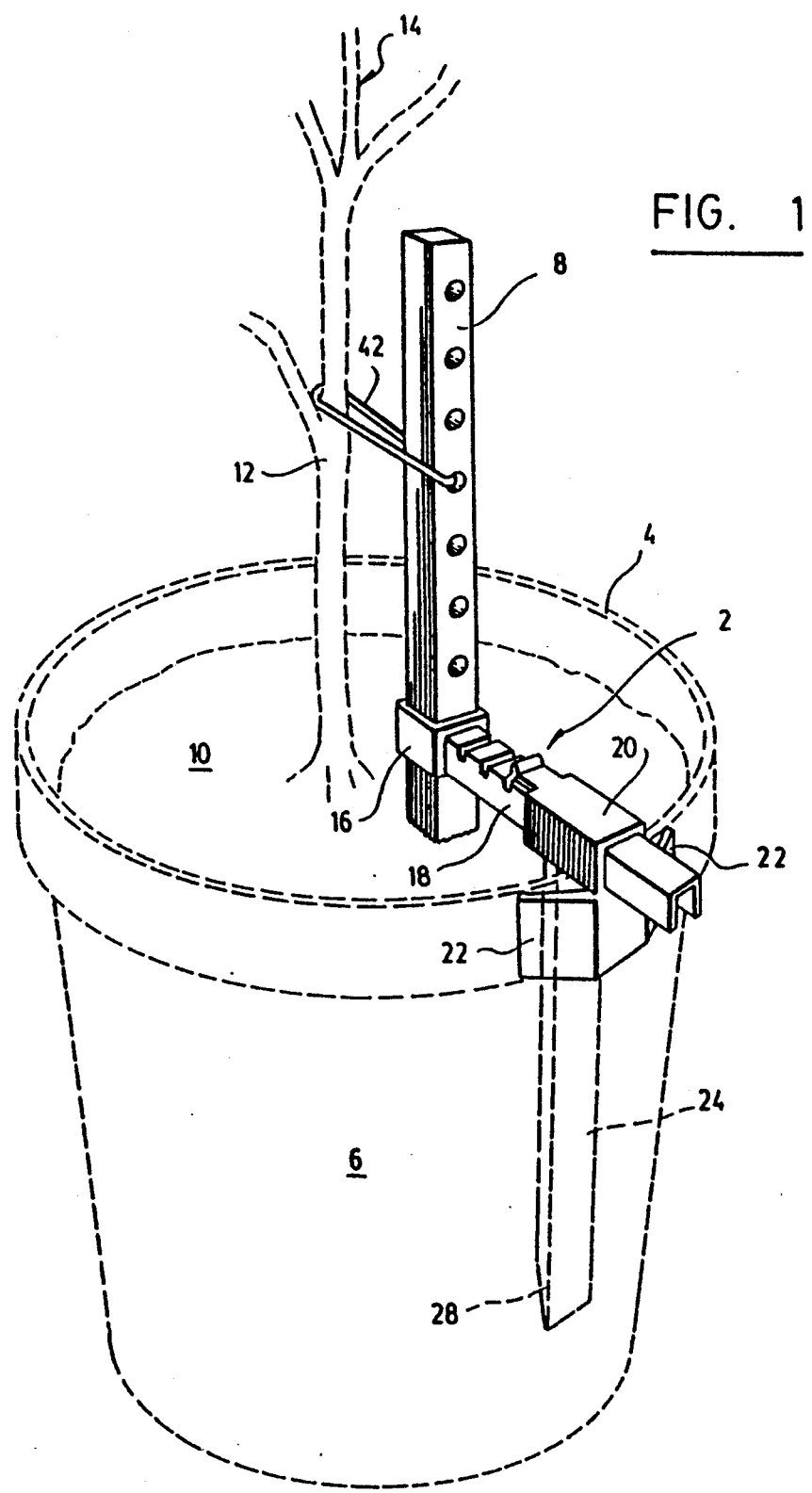
FIG. 1 is a perspective view of a support device according to the invention.
Figure 2:
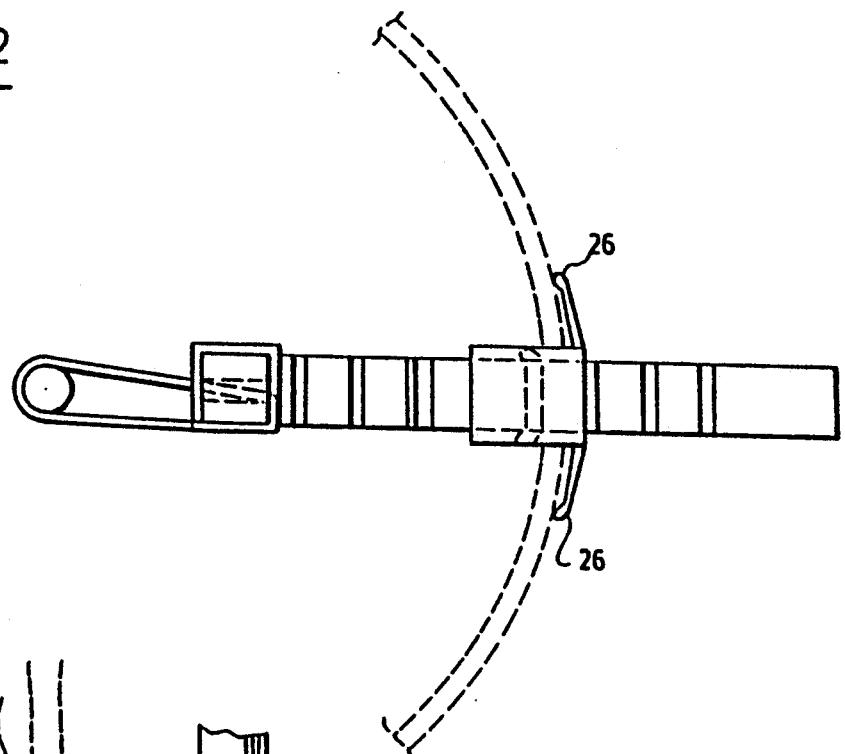
FIG. 2 is a top plan view of the support device shown in FIG. 1.

The support device for an upright prop, according to the present invention as shown in FIGS. 1 and 2, is generally designated by the numeral 2. This device is intended to be attached to the rim 4 of a container 6 which is preferably a plant pot, and to be used as such to hold an upright prop 8 driven in a ground mixture 10 contained in the container 6, as it is customary to straighten up a stem 12 of a potted plant 14.

The device comprises an elongated member 18 formed with a ring 16 at one end in which the prop 8 can be slid and held substantially vertically. The elongated member 18 and the ring 16 are preferably made of a single piece of plastic material. The ring 16 which acts as a prop-fastening means and the prop 8 inserted thereto can be of a square shape to eliminate the possible rotary movement of this last one. However, this design feature is not essential and any other shape of ring could be used, provided that it is sized to receive the prop 8 and to hold it.

Figure 4:
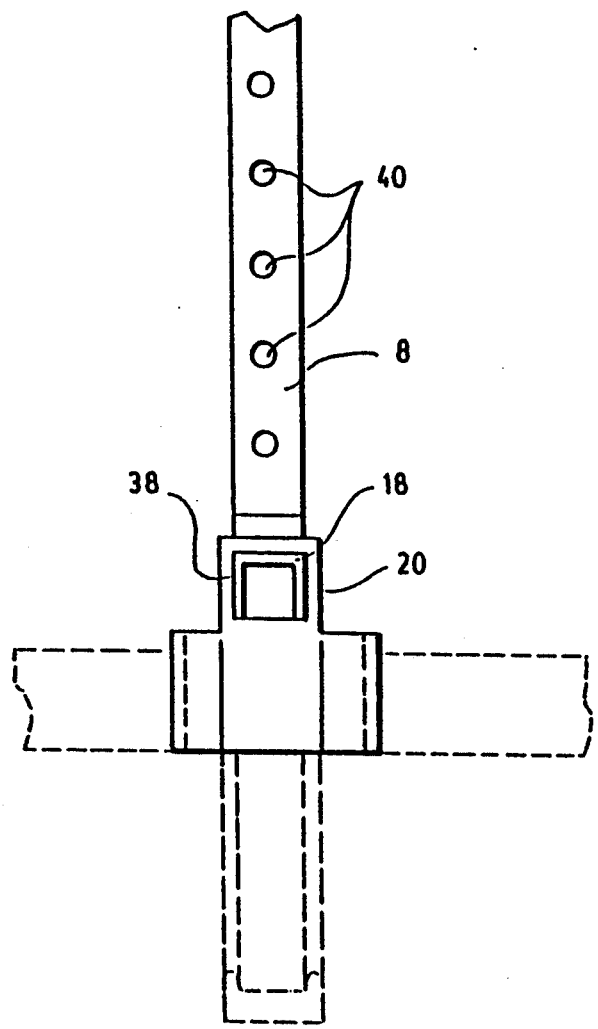
FIG. 4 is a front elevational view of the support device shown in FIG. 1.

The free extremity of the elongated member 18 is slideably received within a sleeve 20 that is detachably connectable to the rim 4 of the container 6 and used to detachably mount the elongated member 18 onto the rim 4 and hold it in a direction substantially perpendicular to the rim 4. The sleeve 20 preferably has a square cross-section 38 and the elongated member 18 preferably has an inverted U-shaped cross-section as is shown in FIG. 4, sized to fit into the sleeve 20. Such a selection of shape is useful inasmuch as it prevents undue rotation of the member 18 within the sleeve, but it is not compulsory.

Figure 3:
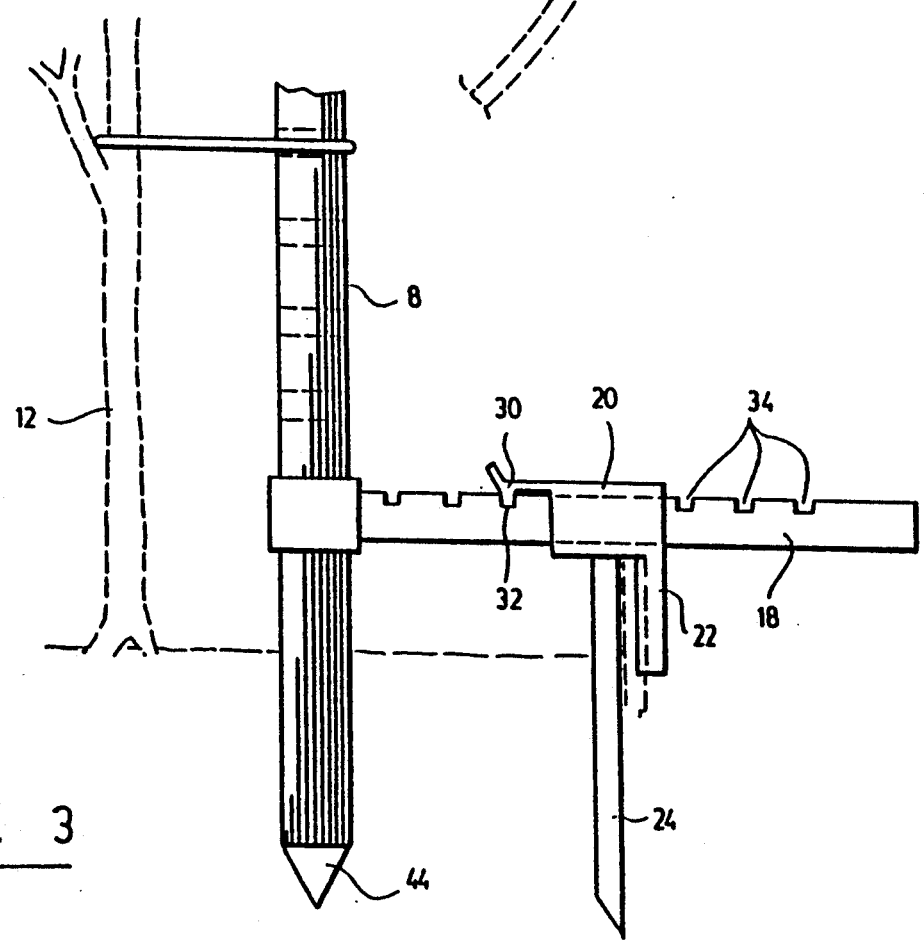
FIG. 3 is a side elevational view of the support device shown in FIG. 1.

Referring now to FIG. 3, locking means are provided for detachably locking the elongated member 18 within the sleeve 20 at any desired position. These locking means preferably comprise a pawl 30 operatively connected to the sleeve 20. The pawl 30 is positioned to fit into a notch 32 which is part of a series of spaced apart notches 34 made transversally on the top surface of the elongated member 18. Any other locking means such as a pin drived in aligned holes in the sleeve 20 and member 18, could however be used as alternative locking means.

Referring again to FIGS. 1 and 2, clipping means are provided to fix the sleeve 20 onto the rim 4. These clipping means as shown in the drawings comprise a pair of flexible ears 22 squeezing the rim 4 against a spike 24 intended to be driven into the ground mixture 10, inside the container 6, adjacent the inner wall thereof. The ears 22 are downwardly projecting under the sleeve 20 and laterally projecting toward the spike 24, so that a section 26 of each ear 22 is always pushing against the rim 4. A of these elements, including the spike 24, the sleeve 20, the pair of ears 22 and the pawl 30, can be molded in another single piece of plastic material. The spike 24 downwardly projects from under the sleeve 20, and has a slender edge 28 to make easier its insertion into the ground mixture 10. This spike is particularly interesting in that it substantially improves stabilization and positioning of the sleeve. Another alternative clipping means could be obtained by replacing the pair of ears 22 by a flexible S-shaped element downwardly projecting under the sleeve 20, the bottom section of said element exerting a pressure on the rim 4 in order to squeeze it with the spike 24.

Referring now to FIG. 4, the prop 8 is preferably provided with a plurality of cylindrical holes 40 horizontally disposed, wherein a string 42 or the like (shown in FIG. 1) may be inserted to link the prop 8 to the stem 12 of the plant 14. The prop 8 may also be provided with a slender cone 44 (shown in FIG. 3) at its lower extremity to facilitate its insertion in the ground mixture 10. All of these features are interesting but not essential.

In use, the elongated member 18 is first slid in the sleeve 20, in an arbitrary position. Secondly, the spike 24 is driven in the ground mixture 10, adjacent to the wall of the container 6 in such a way that the pair of ears 22 is pressing against the external surface of the rim 4, firmly fixing the device 2 to the rim 4 of the container 6. Thirdly, the prop 8 is slid inside the ring 16, its slender cone 44 downward, and the elongated member 18 is adjusted in relationship with the sleeve by the assistance of the pawl 30 and notches 34, in such manner as to position the prop 8 at the desired location on the gorund mixture 10 surface. Lastly, the prop 8 is embedded in the ground mixture 10, and linked with one or more strings 42 to the stem 12 of the plant 14 to hold it.

Although, the present invention has been explained hereinabove by way of a preferred embodiment thereof, it should be pointed out that any modifications to this preferred embodiment within the scope of the appended claims is not deemed to alter or change the nature and scope of the present invention.

The embodiments of the invention in which an exclusive property of privilege is claimed are defined as follows:

1. A support device for rigidly holding an upright prop driven into a ground mixture, said ground mixture being in a container having an upper rim, said device comprising:
   (a) an elongated member;
   (b) prop-fastening means attached to an extremity of said member, for holding substantially vertically said prop when said prop is set in said ground mixture; and
   (c) attaching means for detachably mounting said elongated member onto said upper rim, said attaching means comprising:
      (i) a sleeve for slidably receiving said elongated member in a direction substantially perpendicular to said rim;
      (ii) means for detachably locking said member with said sleeve, said means for detachably locking said member consisting of a pawl and notch system comprising: a pawl operatively associated with said sleeve; and a notch being part of a series of spaced apart notches made in said member; and
      (iii) clipping means for detachably fixing said sleeve to said rim.

2. An apparatus according to claim 1, wherein said prop-fastening means is a ring in which said prop may be slid.

3. An apparatus according to claim 2, wherein said prop-fastening means and said member are made of one single piece of plastic material.

4. An apparatus according to claim 1, wherein said clapping means comprises:
   a rigid spike downwardly projecting from under said sleeve, said spike being driveable into said ground mixture; and
   pressing means opposite to said spike in order to squeeze said rim against said spike.

5. An apparatus according to claim 4, wherein said pressing means comprises a pair of flexible ears downwardly projecting under said sleeve and laterally projecting toward said spike so that a section of each ear is always pushing against said rim.

6. An apparatus according to claim 1, wherein said attaching means is made of one single piece of plastic material.

7. A support device for rigidly holding an upright prop driven into aground mixture, said ground mixture being in a container having an upper rim, said device comprising:
   (a) an elongated member;
   (b) a ring attached to an extremity of said member, in which said prop may be slid and held substantially vertically when said prop is set in said ground mixture, said ring being integral with said elongated member, said ring and elongated member being made of plastic material; and (c) attaching means for detachably mounting said elongated member onto said upper rim, said attaching means being made of one single piece of plastic material and comprising:
  (i) a sleeve for slidably receiving said elongated member in a direction substantially perpendicular to said rim;
  (ii) means for detachably locking said member with said sleeve, said means comprising a pawl being operatively associated with said sleeve, and which can be fit into a notch being part of a series of spaced apart notches made in said elongated member; and
  (iii) clipping means for detachably fixing said sleeve to said rim, said clipping means comprising a pair of flexible ears downwardly projecting under said sleeve and laterally projecting toward a rigid spike so that a section of each ear is always pushing against said rim in order to squeeze said rim against said spike, said spike downwardly projecting from under said sleeve and being drivable into said ground mixture.

* * * * *